United States Patent
Sakai et al.

(10) Patent No.: US 11,567,450 B2
(45) Date of Patent: Jan. 31, 2023

(54) QUANTUM SIMULATOR AND QUANTUM SIMULATION METHOD

(71) Applicants: HAMAMATSU PHOTONICS K.K., Hamamatsu (JP); INTER-UNIVERSITY RESEARCH INSTITUTE CORPORATION NATIONAL INSTITUTES OF NATURAL SCIENCES, Mitaka (JP)

(72) Inventors: Hiroto Sakai, Hamamatsu (JP); Kenji Ohmori, Okazaki (JP); Taro Ando, Hamamatsu (JP); Nobuyuki Takei, Okazaki (JP); Haruyoshi Toyoda, Hamamatsu (JP); Yoshiyuki Ohtake, Hamamatsu (JP); Tomoko Hyodo, Hamamatsu (JP); Yuu Takiguchi, Hamamatsu (JP)

(73) Assignees: HAMAMATSU PHOTONICS K.K., Hamamatsu (JP); INTER-UNIVERSITY RESEARCH INSTITUTE CORPORATION, Mitaka (JP)

( * ) Notice: Subject to any disclaimer, the term of this patent is extended or adjusted under 35 U.S.C. 154(b) by 153 days.

(21) Appl. No.: 17/029,520

(22) Filed: Sep. 23, 2020

(65) Prior Publication Data
US 2021/0011430 A1 Jan. 14, 2021

Related U.S. Application Data

(62) Division of application No. 15/945,016, filed on Apr. 4, 2018, now Pat. No. 10,824,114.

(30) Foreign Application Priority Data

Apr. 10, 2017 (JP) .............................. JP2017-077478

(51) Int. Cl.
*G03H 1/04* (2006.01)
*G03H 1/16* (2006.01)
(Continued)

(52) U.S. Cl.
CPC ............. *G03H 1/16* (2013.01); *G03H 1/0005* (2013.01); *G03H 1/0443* (2013.01);
(Continued)

(58) Field of Classification Search
CPC ...... G03H 1/16; G03H 1/0005; G03H 1/0443; G03H 1/0808; G03H 1/229;
(Continued)

(56) References Cited

U.S. PATENT DOCUMENTS 5,589,955 A 12/1996 Amako et al.
6,285,503 B1 * 9/2001 Chao .................... G02B 5/0252
430/4

(Continued)

FOREIGN PATENT DOCUMENTS

CN   1414424 A    4/2003
JP   S64-044882 A  2/1989
(Continued)

OTHER PUBLICATIONS

"Trapping and cooling cesium atoms in a speckle field", The European Physical Journal D, 7, pp. 373-377 (Year: 1999).*
(Continued)

*Primary Examiner* — Audrey Y Chang
(74) *Attorney, Agent, or Firm* — Faegre Drinker Biddle & Reath LLP

(57) ABSTRACT

A quantum simulator includes a pseudo speckle pattern generator, a main vacuum chamber, an atomic gas supply unit, a light beam generator, a photodetector, and an atom number detector. The pseudo speckle pattern generator generates a pseudo speckle pattern in the inside of the main vacuum chamber by light allowed to enter the inside of the main vacuum chamber through the second window. The pseudo speckle pattern generator includes a controller, a light source, a beam expander, a spatial light modulator, and (Continued)

a lens. The controller sets a modulation distribution of the spatial light modulator based on a two-dimensional pseudo random number pattern.

3 Claims, 16 Drawing Sheets

(51) Int. Cl.
*G03H 1/00* (2006.01)
*G21K 1/00* (2006.01)
*G03H 1/22* (2006.01)
*H05H 3/00* (2006.01)
*G03H 1/08* (2006.01)

(52) U.S. Cl.
CPC ......... *G03H 1/0808* (2013.01); *G03H 1/2294* (2013.01); *G21K 1/006* (2013.01); *H05H 3/00* (2013.01); *G03H 2001/0441* (2013.01); *G03H 2210/55* (2013.01); *G03H 2225/30* (2013.01)

(58) Field of Classification Search
CPC ....... G03H 2001/0441; G03H 2210/55; G03H 2225/30; G21K 1/006
USPC .................................................. 359/9; 348/46
See application file for complete search history.

(56) References Cited

U.S. PATENT DOCUMENTS

| | | | | |
|---|---|---|---|---|
| 6,476,383 | B1* | 11/2002 | Esslinger | H05H 3/02 250/251 |
| 2004/0174600 | A1 | 9/2004 | Westphal | |
| 2010/0177164 | A1* | 7/2010 | Zalevsky | G01B 11/2441 348/46 |
| 2012/0256101 | A1* | 10/2012 | Ye | G01N 21/6458 250/459.1 |

FOREIGN PATENT DOCUMENTS

| | | |
|---|---|---|
| JP | H8-161000 A | 6/1996 |
| JP | 2002-207202 A | 7/2002 |
| JP | 2005-250038 A | 9/2005 |
| JP | 2006-071492 A | 3/2006 |

OTHER PUBLICATIONS

D. Boiron et al., "Trapping and cooling cesium atoms in a speckle field," The European Physical Journal D, vol. 7, 1999, pp. 373-377.

M. Robert-de-Saint-Vincent et al., "Anisotropic 2D Diffusive Expansion of Ultracold Atoms in a Disordered Potential," Physical Review Letters, vol. 104, Jun. 2010, pp. 220602-1-220602-4.

M C Beeler et al., "Disorder-driven loss of phase coherence in a quasi-2D cold atom system," New Journal of Physics, vol. 14, 2012, pp. 1-12.

Sebastian Krinner et al., "Superfluidity with disorder in a thin film of quantum gas," Physical Review Letters, vol. 110, Mar. 2013, pp. 100601-1-100601-5.

Vladlen G. Shvedov et al., "Selective trapping of multiple particles by volume speckle field," Optics Express, vol. 18, No. 3, Feb. 2010, pp. 3137-3142.

E. Mudry et al., "Structured illumination microscopy using unknown speckle patterns," Nature Photonics, vol. 6, May 2012, pp. 312-315.

Yaron Bromberg et al., "Generating Non-Rayleigh Speckles with Tailored Intensity Statistics," Physical Review Letters, vol. 112, May 2014, pp. 213904-1-213904-5.

S. Takeda et al., "Generation of a unit filling Mott insulator of 87Rb atoms for the realization of an ultrafast quantum simulator," The Physical Society of Japan, 72nd Annual Meeting, Mar. 17, 2017 (with attached English-language translation).

* cited by examiner

*Fig.5*

| CORRELATION FUNCTION c(r) | PARAMETER RANGE | FILTER FUNCTION F(k) |
|---|---|---|
| $(r/\eta)^\alpha e^{-r/\xi}$ | $\alpha > -2$ | $\xi\left(\sqrt{\dfrac{\xi}{\eta}}\right)^\alpha \sqrt{\Gamma(\alpha+2)\, F\left(\dfrac{\alpha+2}{2},\dfrac{\alpha+3}{2};1;-\xi^2 k^2\right)}$ |
| $e^{-r/\xi}$ | - | $\xi(1+\xi^2 k^2)^{-3/4}$ |
| $e^{-r/\xi}/r$ | - | $\sqrt{\xi}(1+\xi^2 k^2)^{-1/4}$ |
| $(r/\eta)^\alpha$ | $-2 < \alpha < -\dfrac{1}{2}$ | $\left(\dfrac{\sqrt{2}}{\eta}\right)^\alpha \sqrt{(-\alpha)\Gamma\left(1+\dfrac{\alpha}{2}\right)/\Gamma\left(1-\dfrac{\alpha}{2}\right)}\,\dfrac{1}{k^{1+\alpha/2}}$ |
| $e^{-r^2/\xi^2}$ | - | $(\xi/\sqrt{2})e^{-\xi^2 k^2/8}$ |
| $(r^2 + \xi^2)^\alpha$ | $\alpha < -\dfrac{1}{4}$ | $\left(\sqrt{2\xi/k}\right)^{\alpha+1}\sqrt{K_{\alpha+1}/\Gamma(-\alpha)}$ |
| $\dfrac{e^{-\sqrt{r^2+\eta^2}/\xi}}{\sqrt{r^2+\eta^2}}$ | - | $\sqrt{\xi}\exp\left(-\dfrac{\eta}{2\xi}\sqrt{1+k^2\xi^2}\right)(1+\eta^2\xi^2)^{-1/4}$ |

WHERE, $\Gamma(z)$   GAMMA FUNCTION $F(a,b;c;z)$  GAUSS HYPERGEOMETRIC FUNCTION $$F(a,b;c;z) = \dfrac{\Gamma(c)}{\Gamma(a)\Gamma(b)}\sum_{n=0}^{\infty}\dfrac{\Gamma(a+n)\Gamma(b+n)}{\Gamma(c+n)}\dfrac{z^n}{n!}$$

$K_n(z)$   $\eta$-TH ORDER "MODIFIED BESSEL FUNCTION OF THE SECOND KIND"

0　　　　　　　　　　　　　　255

QUANTUM SIMULATOR AND QUANTUM SIMULATION METHOD

BACKGROUND OF THE INVENTION

Field of the Invention

The present disclosure relates to a quantum simulator and a quantum simulation method.

Related Background Art

The behavior of a substance in a micro region of atomic level has been known to obey quantum mechanics. A phenomenon in such a micro region has a length scale which is significantly different from a scale of the real world, and does not usually appear in a form which is directly visible to us. However, due to the development of a science and technology in recent years, an effective technique which uses quantum mechanical effects has begun to be produced. The range of applications of the technique extends widely, such as superconductivity, a communication element, development of a medicine, and a substance with a new function (such as a special electric conductive substance, and a strong magnet), and accordingly, understanding the behavior of quanta is becoming important as a first step of producing a new technique.

In an actual substance, the above-described quantum mechanical effects are generated through interactions between a large number of particles. Even in such a situation, describing a phenomenon by quantum mechanics is supposed to be possible in principle, however, quantum mechanics including a plurality of particles (quantum many-body problem) is extremely complicated, and predicting the behavior theoretically and numerically can be considered impossible in actuality, except for an ideal form which is significantly deviated from a real system.

A quantum simulator gathers attention in recent years as a method for studying the quantum mechanical many-body problem which is complicated as described above. The quantum simulator prepares a model system including physical characteristics of an object under study, and actually drives the model to observe what phenomenon occurs. For example, when studying a quantum mechanical phenomenon in a crystal, the quantum simulator is suitable to prepare a model system in which appropriate atoms are arranged according to spatial arrangement in accordance with a crystal structure. In an actual crystal, an interatomic distance is small, and observing the behavior of the atoms is difficult, however, by arranging atoms at intervals of micrometers, it is possible to prepare a model system of a size in which a quantum phenomenon can be easily controlled and observed.

The quantum simulator controls positions of arranged atoms and/or applies some stimulus to each of the arranged atoms, so as to be able to detect an influence which appears in an entire system. The quantum simulator uses an optical trap technique in which light is focused to trap atoms at the focal position as a means for arranging atoms. Further, the quantum simulator uses a technique of generating a light pattern having a predetermined shape and irradiating arranged atoms as a means for applying a stimulus to the atoms. By repeating a detection process a plurality of times under an identical condition, for example, existence probability of an electron that is important for analysis can be known, and for this reason, excellent controllability and reproducibility are required for both of the means for arranging atoms and the means for applying a stimulus to the atoms.

Arrangement of atoms in an actual crystal is not completely periodical, and there exists an irregular component caused by a crystal defect due to partial missing or distortion, by mixing of impurities, and the like. In addition, atoms in a crystal are applied with an action of a disordered force (thermal vibration) in a finite temperature range. The irregularities due to a defect, impurities, thermal vibration, and the like, which have a large influence on an electric conduction, an optical characteristic, and the like, are non-negligible in studying an actual behavior of a substance. Accordingly, in order to trap atoms at a plurality of irregular positions, or reproduce a stimulus applied by disordered thermal vibration, establishing a means for generating an irregular light intensity distribution is important for achieving a function of studying an actual substance by using the quantum simulator.

When atoms are trapped at a plurality of positions arranged regularly in the optical trap technique, one-directional periodic bright and dark interference fringes of light are formed by arranging two light beams to interfere with each other, or a periodic bright and dark distribution in three dimensions is formed by forming interference fringes superimposing in three dimensions. In the latter case, a "simple cubic lattice" having a simple crystal structure can be reproduced. Further, in recent years, an attempt has been made to reproduce a variety of atomic arrangements by using a computer generated hologram, and arranging atoms by imitating a variety of crystal structures in the natural world is becoming possible.

As described in Non-Patent Documents 1 to 4, when atoms are trapped at a plurality of irregular positions in the optical trap technique, or when a disordered force field is applied to an atom group, a speckle pattern is generated by using a diffuser (scattering medium) and a lens, and a light wavelength is selected appropriately in accordance with atoms to be trapped, and in this manner, atoms can be trapped at a position with high luminance or at a position with low luminance in the speckle pattern, or an action of a disordered force field formed by the speckle pattern can be provided. Hereinafter, description will be made on a case where atoms are trapped at a position with high luminance. Further, Non-Patent Documents 5 and 6 describe a technique of generating a speckle pattern by using a diffuser and a lens. Non-Patent Document 7 describes a technique of generating a speckle pattern by using a spatial light modulator and a lens.

Here, a speckle pattern is generated by multiple interference of scattered light which is obtained from coherent light, such as laser light, scattered by a diffuser, such as a diffuser plate. A spatial distribution of light intensities in a speckle pattern has a property close to that of a random number pattern, and for this reason, a speckle pattern is used in an interference technique, a super-resolution microscopy, an optical measurement technique, and the like, and further, is recently used in an optical manipulation, such as trapping of an atom and a particle colloid.

A speckle pattern is characterized by a spatial structure and a light intensity statistical distribution. The spatial structure is expressed by a spatial shape of an autocorrelation function of a speckle pattern, and corresponds to a point spread function (PSF) of an optical system. The light intensity statistical distribution is expressed by a histogram of a light intensity in a speckle pattern, and follows an exponential distribution. Here, a spatial structure (autocorrelation function) of a two-dimensional pseudo random number pattern in which pseudo random numbers are arranged two-dimensionally is approximated by a delta function.

Non-Patent Document 1: D. Boiron et al., "Trapping and cooling cesium atoms in a speckle field", Eur. Phys. J. D 7, pp. 373-377 (1999)

Non-Patent Document 2: M. Robert-de-Saint-Vincent et al., "Anisotropic 2D Diffusive Expansion of Ultracold Atoms in a Disordered Potential", Phys. Rev. Lett. 104, pp. 220602-1-220602-4 (2010)

Non-Patent Document 3: M C Beeler et al., "Disorder-driven loss of phase coherence in a quasi-2D cold atom system", New J. Phys. 14, 073024 pp. 1-12 (2012)

Non-Patent Document 4: Sebastian Krinner et al., "Superfluidity with disorder in a thin film of quantum gas", Phys. Rev. Lett. 110, pp. 100601-1-100601-5 (2013)

Non-Patent Document 5: Vladlen G Shvedov et al., "Selective trapping of multiple particles by volume speckle field", OPTICS EXPRESS, Vol. 18, No. 3, pp. 3137-3142 (2010)

Non-Patent Document 6: E. Mudry et al., "Structured illumination microscopy using unknown speckle patterns", NATURE PHOTONICS, Vol. 6, pp. 312-315 (2012)

Non-Patent Document 7: Yaron Bromberg and Hui Cao, "Generating Non-Rayleigh Speckles with Tailored Intensity Statistics", PHYSICAL REVIEW LETTERS 112, pp. 213904-1-213904-5 (2014)

SUMMARY OF THE INVENTION

The techniques described in Non-Patent Documents 1 to 6 use a diffuser, and accordingly, degree of freedom in setting a spatial structure and a light intensity statistical distribution of a generated speckle pattern and "degree of reproduction" of the structure and the distribution are zero or low. The technique described in Non-Patent Document 7 can change a speckle pattern by changing a modulation distribution displayed on a spatial light modulator in accordance with a two-dimensional pseudo random number pattern. However, even in this technique, only contrast of a speckle pattern is adjusted, and therefore, degree of freedom in setting a spatial structure and a light intensity statistical distribution of a generated speckle pattern and "degree of reproduction" of the structure and the distribution are low.

Accordingly, a conventional quantum simulator which performs optical trap or simulation of an effect of a disordered force field by using a speckle pattern, or a quantum simulation method using the quantum simulator cannot generate a speckle pattern having a desired spatial structure or a light intensity statistical distribution with excellent reproducibility, and for this reason, a preferred model which shows a characteristic of an object properly is difficult to be constructed.

An object of embodiments is to provide a quantum simulator and a quantum simulation method excellent in reproducibility and controllability which can easily construct a preferred model showing a characteristic of an object properly.

A pattern generated in the embodiments will be referred to as a "pseudo speckle pattern", since the pattern can have a spatial structure or a light intensity statistical distribution which are different from those of a normal speckle pattern generated by using a diffuser.

An embodiment of the present invention is a quantum simulator. The quantum simulator includes (1) a chamber having a window, (2) a pseudo speckle pattern generator configured to generate a pseudo speckle pattern in the inside of the chamber by light allowed to enter the inside of the chamber through the window, and (3) a detector configured to detect an influence of generation of the pseudo speckle pattern on an atom in the inside of the chamber.

The pseudo speckle pattern generator of the quantum simulator includes, in one aspect, (a) a light source configured to output light, (b) a spatial light modulator configured to have a settable modulation distribution of an intensity, spatially modulate the light output from the light source in accordance with the modulation distribution, and output the modulated light as the pseudo speckle pattern, and (c) a controller configured to set the modulation distribution of the spatial light modulator based on a pseudo random number pattern.

The pseudo speckle pattern generator of the quantum simulator includes, in another aspect, (a) a light source configured to output light, (b) a spatial light modulator configured to have a settable modulation distribution of a phase, spatially modulate the light output from the light source in accordance with the modulation distribution, and output the modulated light, (c) a reproducing optical system configured to input the light output from the spatial light modulator to reproduce the pseudo speckle pattern in the inside of the chamber, and (d) a controller configured to set a computer generated hologram obtained based on a pseudo random number pattern as the modulation distribution of the spatial light modulator.

An embodiment of the present invention is a quantum simulation method. The quantum simulation method includes (1) generating, by a pseudo speckle pattern generator, a pseudo speckle pattern in the inside of a chamber by light allowed to enter the inside of the chamber through a window of the chamber, and (2) detecting, by a detector, an influence of generation of the pseudo speckle pattern on an atom in the inside of the chamber.

In generating the pseudo speckle pattern in the quantum simulation method, in one aspect, a spatial light modulator configured to have a settable modulation distribution of an intensity is used, the modulation distribution of the spatial light modulator is set based on a pseudo random number pattern, and light output from a light source is spatially modulated in accordance with the modulation distribution, and the modulated light is output as the pseudo speckle pattern.

In generating the pseudo speckle pattern in the quantum simulation method, in another aspect, a spatial light modulator configured to have a settable modulation distribution of a phase is used, a computer generated hologram obtained based on a pseudo random number pattern is set as the modulation distribution of the spatial light modulator, light output from a light source is spatially modulated in accordance with the modulation distribution, and the modulated light is output, and a reproducing optical system configured to input the light output from the spatial light modulator is used to reproduce the pseudo speckle pattern in the inside of the chamber.

According to the embodiments, a preferred model showing a characteristic of an object properly can be constructed easily, and the embodiments are excellent in reproducibility and controllability.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 5 is a table showing examples of a correlation function c and a filter function F.

DESCRIPTION OF THE EMBODIMENTS

Hereinafter, embodiments of a quantum simulator and a quantum simulation method will be described in detail with reference to the accompanying drawings. In the description of the drawings, the same elements will be denoted with the same reference symbols, and overlapping description will be omitted.

First, description will be made on the embodiments of the quantum simulator and the quantum simulation method, and then description will be made on an operation example of the quantum simulator and an example of the quantum simulation method. After that, embodiments of a pseudo speckle pattern generator and a pseudo speckle pattern generation method which are important parts thereof will be described in detail.

Figure 1:
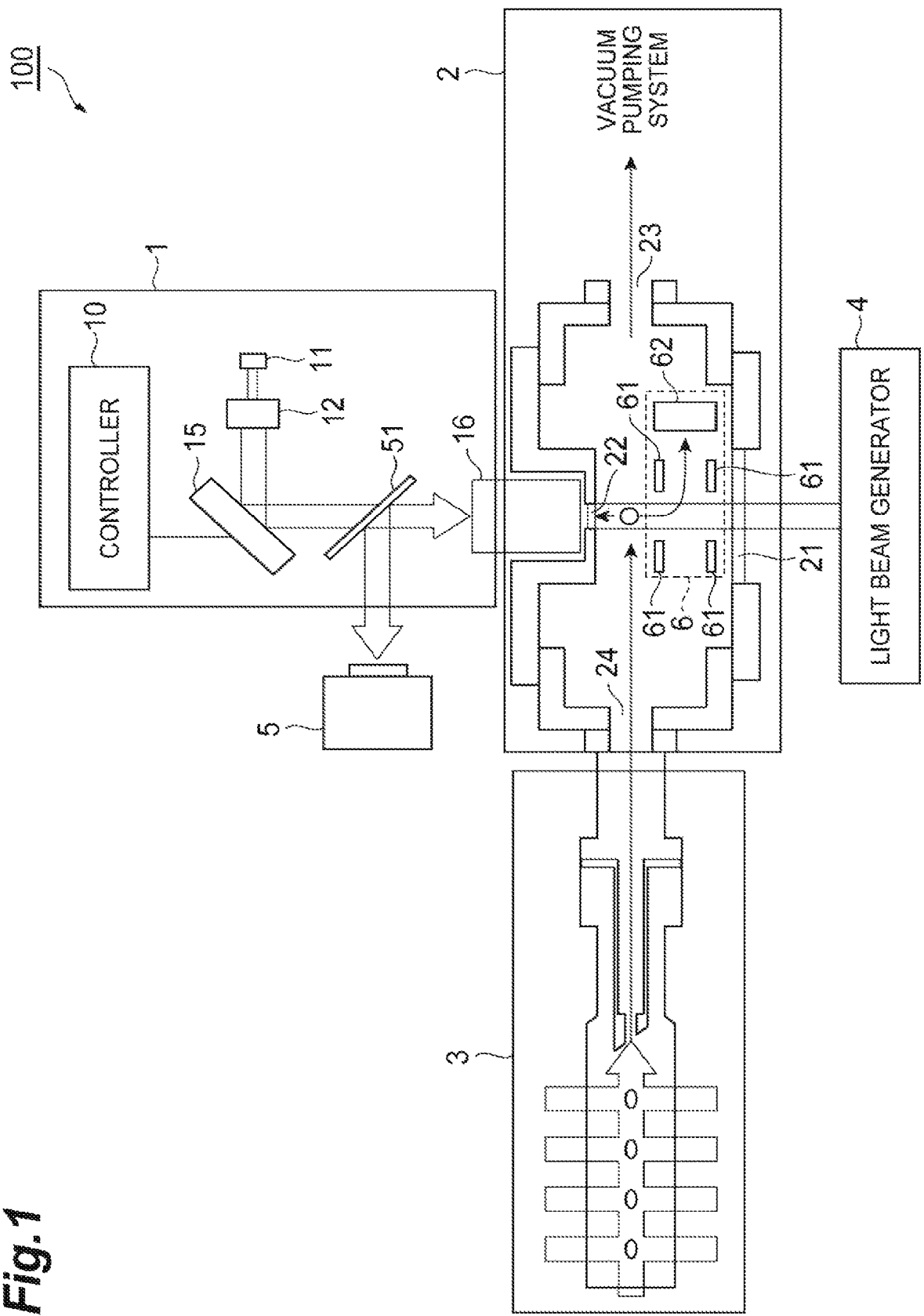
FIG. 1 is a diagram illustrating a configuration of a quantum simulator 100 of the present embodiment.

FIG. 1 is a diagram illustrating a configuration of a quantum simulator 100 of the present embodiment. The quantum simulator 100 includes a pseudo speckle pattern generator 1, a main vacuum chamber (chamber) 2, an atomic gas supply unit 3, a light beam generator 4, a photodetector 5, and an atom number detector 6.

The main vacuum chamber (chamber) 2 includes windows (a first window 21 and a second window 22) which allow light to pass through between the outside and the inside. The first window 21 is optically coupled to the light beam generator 4. The second window 22 is optically coupled to the pseudo speckle pattern generator 1. Here, the first window and the second window may be configured with a common window.

The main vacuum chamber 2 includes an exhaust opening 23 used for exhausting gas in the inside by a vacuum pumping system, and can maintain the inside in an ultra-high vacuum state by exhaust using a pump and adsorption of gas using a getter. The main vacuum chamber 2 includes an atomic gas introduction opening 24 for introducing an atomic gas supplied from the atomic gas supply unit 3 into the inside. Further, the main vacuum chamber 2 includes an MOT magnetic circuit for trapping an atom by actions of light and a magnetic field. MOT is an abbreviation of "magneto-optical trap", and is a technique for trapping an atom group by actions of light and a magnetic field.

The atomic gas supply unit 3 supplies an atomic gas to the inside of the main vacuum chamber 2. The atomic gas supply unit 3 includes a heater which is arranged in the inside or around a vacuum glass cell and generates atoms in a gas state by heating a desired metal atom or a compound or the like including a desired atom, and a magnetic circuit including coils or the like which generates a magnetic field by applying an electric current. The atomic gas supply unit 3 generates the atomic gas by the heater heating a metal atom, and traps a metal gas by light pressure of laser light with which the vacuum glass cell is irradiated and actions of light and a magnetic field. The atomic gas supply unit 3 then transports the trapped atomic gas to a predetermined position by light pressure of other laser light irradiation, and supplies the atomic gas through the atomic gas introduction opening 24 of the main vacuum chamber 2 to the inside of the main vacuum chamber 2.

The light beam generator 4 generates a light beam which enters the inside of the main vacuum chamber 2 through the first window 21 and traps an atom in the inside of the main vacuum chamber 2. The light beam emitted to the inside of the main vacuum chamber 2 from the light beam generator 4 through the first window 21 is preferably laser light. Atoms in the inside of the main vacuum chamber 2 are trapped by light pressure of the laser light and actions of light and a magnetic field. Further, the trapped atoms are transported to or arranged at a predetermined position by light pressure of other laser light. The atoms may further be excited by still other laser light and a radio wave from a radio wave generation source. The light beam generator 4 generates the above laser light, and further, generates a radio wave and a terahertz wave.

The pseudo speckle pattern generator 1 generates a pseudo speckle pattern in the inside of the main vacuum chamber 2 by light which is allowed to enter the inside of the main vacuum chamber 2 through the second window 22. The pseudo speckle pattern generator 1 includes a controller 10, a light source 11, a beam expander 12, a spatial light modulator 15, and a lens 16.

The light source 11 outputs light. The beam expander 12 is optically coupled to the light source 11, and outputs the light output from the light source 11 after enlarging a beam diameter. The spatial light modulator 15 is of a phase modulation type, and has a settable modulation distribution of a phase. The spatial light modulator 15 is optically coupled to the beam expander 12, inputs the light which is output from the light source 11 and has a beam diameter enlarged by the beam expander 12, spatially modulates the input light in accordance with the modulation distribution, and outputs the modulated light.

The lens 16 is optically coupled to the spatial light modulator 15, and is preferably an objective lens having a high NA. The lens 16 inputs the light output from the spatial light modulator 15, and allows the light to enter the inside of the main vacuum chamber 2 through the second window 22. The lens 16 is a reproducing optical system which reproduces a pseudo speckle pattern in the inside of the main vacuum chamber 2 by the light which is allowed to enter the inside of the main vacuum chamber 2. The controller 10 sets a computer generated hologram obtained based on a two-dimensional pseudo random number pattern (preferably further based on a correlation function) as the modulation distribution of the spatial light modulator 15. Details of the pseudo speckle pattern generator 1 will be described later.

A dichroic mirror 51 is inserted on an optical path between the spatial light modulator 15 and the lens 16. The dichroic mirror 51 allows light output from the light source 11 to pass through, and light, such as fluorescence, generated by atoms in the inside of the main vacuum chamber 2 to pass through. The photodetector 5 receives light which passes through the second window 22 and is reflected by the dichroic mirror 51 in light, such as fluorescence, generated by atoms in the inside of the main vacuum chamber 2. The photodetector 5 may detect an intensity of the received light, or may detect a spectrum (for example, a fluorescence spectrum or an absorption spectrum) of the received light. Further, the photodetector 5 may be a CCD camera which can detect a two-dimensional image of the intensity or the spectrum.

The atom number detector 6 includes an ionization electrode 61 and an ion detector 62 provided in the inside of the main vacuum chamber 2. In the atom number detector 6, an atom in a predetermined state is ionized by an electric field formed by the ionization electrode 61 or by emitting one or more beams of pulse light having an appropriate wavelength from the outside, and the ion detector 62 counts the number of the ions. Each of the photodetector 5 and the atom number detector 6 counts the number of generated ions by changing ionization conditions, so as to be able to detect an influence of generation of a pseudo speckle pattern on an atom in the inside of the main vacuum chamber 2.

The quantum simulation method of the present embodiment is performed by using the quantum simulator 100 having the above configuration, and includes an atomic gas supply step, a light beam generation step, a pseudo speckle pattern generation step, and a detection step.

In the atomic gas supply step, the atomic gas supply unit 3 supplies an atomic gas to the inside of the main vacuum chamber 2 which is in a vacuum state. In the light beam generation step, the light beam generator 4 generates a light beam which traps atoms in the inside of the main vacuum chamber 2, and the light beam is allowed to enter the inside of the main vacuum chamber 2 through the first window 21. By the light beam irradiation, atoms are trapped, and the atoms are transported or arranged, or the atoms are excited.

In the pseudo speckle pattern generation step, the pseudo speckle pattern generator 1 generates a pseudo speckle pattern in the inside of the main vacuum chamber 2 by light which is allowed to enter the inside of the main vacuum chamber 2 through the second window 22. In the pseudo speckle pattern generation step, the spatial light modulator 15 having a settable phase modulation distribution spatially modulates light, which is output from the light source 11 and has a beam diameter expanded by the beam expander 12, in accordance with the modulation distribution, and the modulated light is output. Then, the lens 16 which inputs light output from the spatial light modulator 15 reproduces the pseudo speckle pattern in the inside of the main vacuum chamber 2. Further, the controller 10 sets a computer generated hologram obtained based on a two-dimensional pseudo random number pattern (preferably further based on a correlation function) as the modulation distribution in the spatial light modulator 15.

In the detection step, a detector (the photodetector 5 or the atom number detector 6) detects an influence of generation of the pseudo speckle pattern on atoms in the inside of the main vacuum chamber 2. By performing the detection by changing a time difference between the generation of the pseudo speckle pattern and the detection, an influence of the generation of the pseudo speckle pattern on atoms can be detected.

Three modes described below can be considered as a measurement means.

In a first measurement means, the light beam generator 4 arranges atoms supplied by the atomic gas supply unit 3 to the inside of the main vacuum chamber 2 regardless of existence or non-existence of regularity, and the photodetector 5 or the atom number detector 6 measures a state of the atoms.

In a second measurement means, the light beam generator 4 arranges atoms supplied by the atomic gas supply unit 3 to the inside of the main vacuum chamber 2 regardless of existence or non-existence of regularity, the pseudo speckle pattern generator 1 emits a pseudo speckle pattern to provide a stimulus to the atoms, and the photodetector 5 or the atom number detector 6 measures a state of the atoms after a predetermined period of time elapses.

In a third measurement means, the light beam generator 4 arranges atoms supplied by the atomic gas supply unit 3 to the inside of the main vacuum chamber 2 regardless of existence or non-existence of regularity, the pseudo speckle pattern generator 1 emits a pseudo speckle pattern so that the atoms are rearranged irregularly, and the photodetector 5 or the atom number detector 6 measures a state of the rearranged atoms.

Two modes described below can be considered as a measurement value.

A first measurement value is a measurement value of a fluorescence spectrum or an absorption spectrum obtained by the photodetector 5. A second measurement value is a measurement value of the number of ions obtained by the atom number detector 6.

Four modes described below can be considered as a measurement object.

A first measurement object is an atom group itself supplied by the atomic gas supply unit 3. A second measurement object is an ion group of atoms ionized by the ionization electrode 61 provided in the inside of the main vacuum chamber 2.

A third measurement object is a Bose-Einstein Condensate (BEC). A BEC is generated by selectively trapping (evaporation cooling) only atoms having a small momentum when an intensity of laser light for trapping atoms introduced into the inside of the main vacuum chamber 2 from the light beam generator 4 is gradually weakened.

A fourth measurement object is a Rydberg atom group. A Rydberg atom is an atom in a highly-excited state in which an electron is excited in an orbit of a principal quantum number of 10 or larger, and is generated when laser light having one or more wavelengths appropriately selected in accordance with atomic species or a radio wave having one or more frequencies appropriately selected is emitted from the light beam generator 4 to an atom in the inside of the main vacuum chamber 2 in multiple steps.

Two modes described below can be considered as an optical operation for a measurement object.

A first optical operation is an operation of a measurement object based on a lattice pattern of light by a standing wave of light. A second optical operation is an operation of a measurement object based on a light pattern by reproduction of a hologram. These operations are performed by a light beam which is allowed to enter the inside of the main vacuum chamber 2 from the light beam generator 4.

Seven modes described below can be considered as an arranging means for a measurement object.

A first arranging means arranges a measurement object by MOT in the inside of the main vacuum chamber 2. A second arranging means maintains a state in which a measurement object is arranged by MOT in the inside of the main vacuum chamber 2, and arranges the measurement object at a predetermined position by light pressure by another laser light irradiation. A third arranging means interrupts MOT after arranging a measurement object by MOT in the inside of the main vacuum chamber 2, and arranges the measurement object at a predetermined position by light pressure by another laser light irradiation.

A fourth arranging means maintains a state in which a measurement object is arranged by MOT in the inside of the main vacuum chamber 2, and arranges the measurement object at a predetermined position by light pressure by another laser light irradiation applied with the first optical operation. A fifth arranging means interrupts MOT after arranging a measurement object by MOT in the inside of the main vacuum chamber 2, and arranges the measurement object at a predetermined position by light pressure by another laser light irradiation applied with the first optical operation.

A sixth arranging means maintains a state in which a measurement object is arranged by MOT in the inside of the main vacuum chamber 2, and arranges the measurement object at a predetermined position by light pressure by another laser light irradiation applied with the second optical operation. A seventh arranging means interrupts MOT after arranging a measurement object by MOT in the inside of the main vacuum chamber 2, and arranges the measurement object at a predetermined position by light pressure by another laser light irradiation applied with the second optical operation.

In the quantum simulator 100 and the quantum simulation method of the present embodiment, the above first to third measurement means, first and second measurement values, first to fourth measurement objects, first and second optical operations, and first to seventh arranging means can be combined in variety of ways, so that a model showing a characteristic of a crystal structure can be constructed, and the crystal structure can be studied.

That is, in the atomic gas supply step, an atomic gas is supplied from the atomic gas supply unit 3 to the inside of the main vacuum chamber 2, in the light beam generation step, a light beam is emitted from the light beam generator 4 to the inside of the main vacuum chamber 2, and any of the first to seventh arranging means arranges atoms in the inside of the main vacuum chamber 2. Further, a light beam or a radio wave is emitted from the light beam generator 4 to the inside of the main vacuum chamber 2, and the arranged atoms are converted to any of the first to fourth measurement objects.

After that, in the pseudo speckle pattern generation step, the pseudo speckle pattern generator 1 generates a pseudo speckle pattern in the inside of the main vacuum chamber 2, and rearranges or provides fluctuation to the atoms in the inside of the main vacuum chamber 2. Then, in the detection step, the photodetector 5 or the atom number detector 6 is used, and any of the first and second measurement values is acquired by any of the first to third measurement means. In this manner, an influence of disorder on a measurement object or arrangement of a measurement object can be found.

Figure 2:
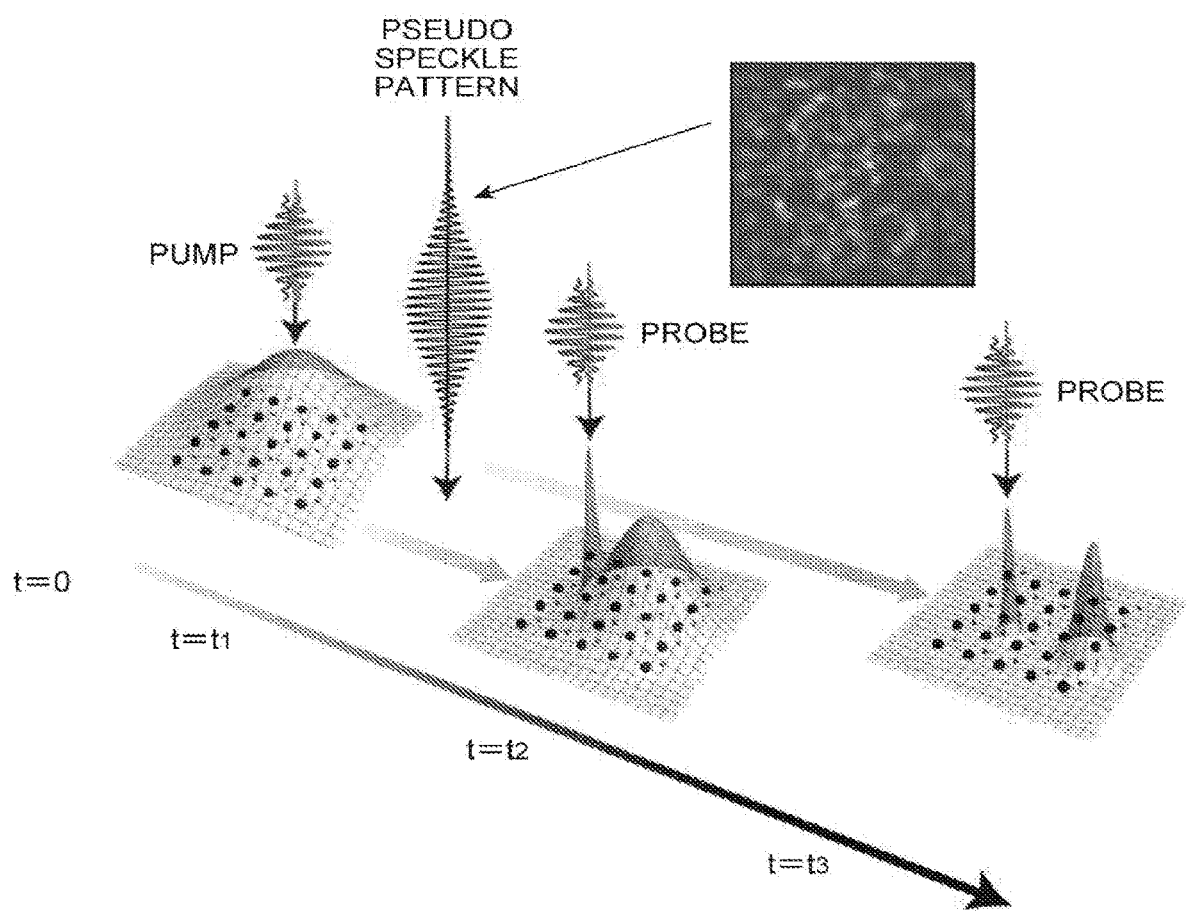
FIG. 2 is a diagram for explaining an example of operation of the quantum simulator 100 and an example of a quantum simulation method.

A more specific example of operation of the quantum simulator 100 and an example of the quantum simulation method are as described below. FIG. 2 is a diagram for explaining an example of operation of the quantum simulator 100 and an example of the quantum simulation method.

After the atomic gas supply unit 3 supplies an atomic gas to the inside of the main vacuum chamber 2, the light beam generator 4 emits a light beam to the inside of the main vacuum chamber 2, and, for example, the seventh arranging means arranges atoms in the inside of the main vacuum chamber 2 two-dimensionally in five rows and five columns. In addition, pump light is emitted from the light beam generator 4 to the inside of the main vacuum chamber 2, and the arranged atoms are converted to the fourth measurement object. A time t at which the pump light is emitted is t=0. At a timing of $t=t_1$, the pseudo speckle pattern generator 1 generates a pseudo speckle pattern in the inside of the main vacuum chamber 2. At a predetermined time $t=t_2$ after $t=t_1$, the light beam generator 4 emits probe light to a measurement point in the inside of the main vacuum chamber 2, and the second measurement means acquires the second measurement value.

Here, in response to the probe light irradiation, ions are generated in accordance with an existence probability of an electron at the measurement point, and therefore, by repeating the process from the supply of the atomic gas to the acquisition of the second measurement value a plurality of times, an existence probability of an electron can be known. In addition, by accumulating the second measurement values by changing a position of the measurement point to which the probe light is emitted and also changing the probe light emission time $t=t_2$ to a variety of times, such as a time $t=t_3$, spatial and temporal changes in an influence of disorder on the measurement object or an electron distribution in the measurement object can be tracked.

Next, detailed description will be made on an embodiment of the pseudo speckle pattern generator 1 included in the quantum simulator 100 and an embodiment of the pseudo speckle pattern generation method included in the quantum simulation method. The pseudo speckle pattern generator 1 and the pseudo speckle pattern generation method of the present embodiment optically generates a pseudo speckle pattern b(x, y) based on a two-dimensional pseudo random number pattern a(x, y) and a filter function F(u, v).

Figure 3:
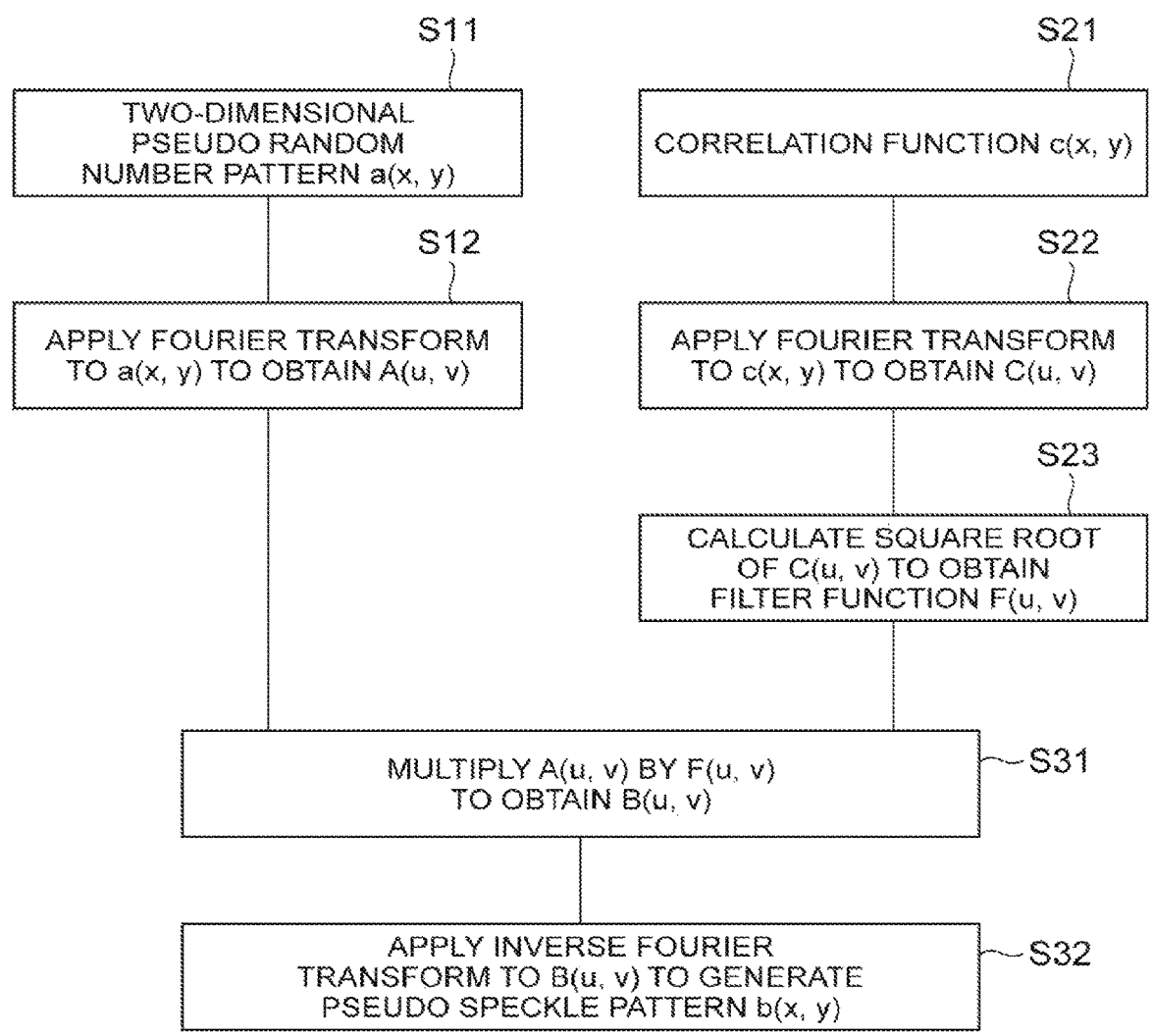
FIG. 3 is a flowchart of a calculation procedure for obtaining a pseudo speckle pattern by calculation.

Description will be made on a pseudo speckle pattern generated in the present embodiment. FIG. 3 is a flowchart of a calculation procedure for obtaining a pseudo speckle pattern by calculation. In functions described below, a function represented by a small letter is a function in real space, and a function represented by a capital letter is a function in Fourier space. Further, (x, y) show a position expressed by an orthogonal coordinate system in real space, and (u, v) show a position expressed by an orthogonal coordinate system in Fourier space.

In step S1, the two-dimensional pseudo random number pattern a(x, y) is generated. Specifically, a one-dimensional pseudo random number sequence which follows a predetermined seed number and a statistical distribution is generated by an arbitrary generation method, and such pseudo random numbers are arranged two-dimensionally to generate the two-dimensional pseudo random number pattern a(x, y). When the seed number and the statistical distribution at the time of the generation of the one-dimensional pseudo random number sequence and an arrangement rule at the time of the two-dimensional arrangement are the same, generation of the two-dimensional pseudo random number pattern a(x, y) has reproducibility. In step S12, a(x, y) is applied with Fourier transform to obtain A(u, v) (formula (1)).

$$A(u,v) = \text{FFT}[a(x,y)] \quad (1)$$

In step S21, a correlation function c(x, y) is prepared. In step S22, c(x, y) is applied with Fourier transform to obtain C(u, v) (formula (2)). In step S23, a square root of C(u, v) is calculated to obtain the filter function F(u, v)(formula (3)).

$$C(u,v) = \text{FFT}[c(x,y)] \quad (2)$$

$$F(u,v) = \sqrt{C(u,v)} \quad (3)$$

In step S31, A(u, v) is multiplied by F(u, v) to obtain B(u, v) (formula (4)). Then, in step S32, B(u, v) is applied with inverse Fourier transform to obtain a pseudo speckle pattern b(x, y) (formula (5)). Here, Fourier transform and inverse Fourier transform can be performed by similar calculation processing when numerical values are calculated, and further, can be implemented by similar optical systems when implemented by an optical system, and accordingly, these do not need to be distinguished.

$$B(u,v) = A(u,v) \cdot F(u,v) \quad (4)$$

$$b(x,y) = \text{IFFT}[B(u,v)] \quad (5)$$

The pseudo speckle pattern b(x, y) generated in the above manner has a light intensity statistical distribution in accordance with a statistical distribution of the two-dimensional pseudo random number pattern a(x, y) and a spatial structure (autocorrelation function) in accordance with the correlation function c(x, y) corresponding to the filter function F(u, v). Here, the filter function F(u, v) is obtained by calculating a square root of C(u, v) in step S23 in order to allow the autocorrelation function of the pseudo speckle pattern b(x, y) and the correlation function c(x, y) to match with each other.

Figure 4:
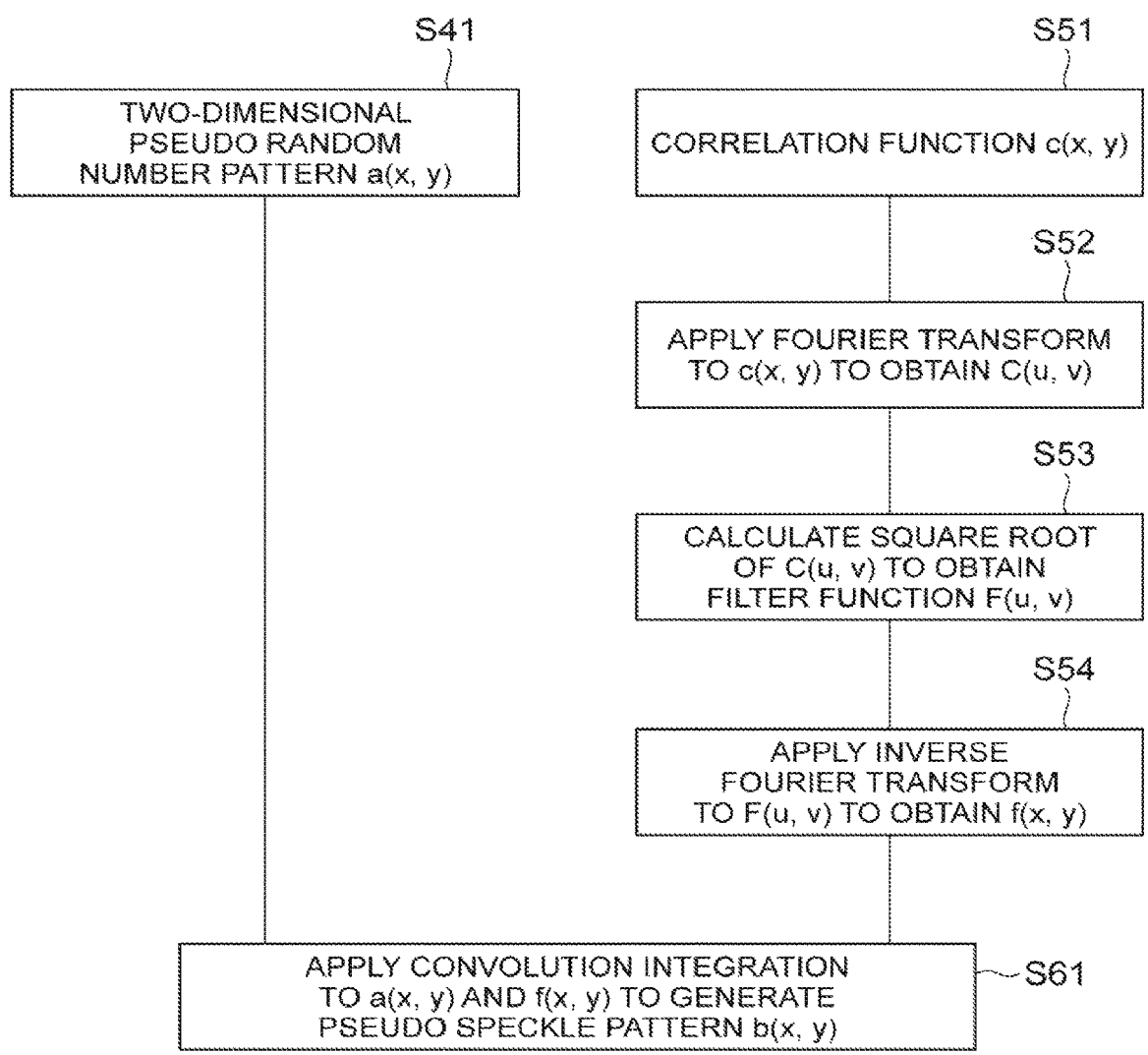
FIG. 4 is a flowchart of another calculation procedure for obtaining a pseudo speckle pattern by calculation.

A pseudo speckle pattern can also be obtained by following another calculation procedure. FIG. 4 is a flowchart of another calculation procedure for obtaining a pseudo speckle pattern by calculation.

In step S41, the two-dimensional pseudo random number pattern a(x, y) is generated. In step S51, the correlation function c(x, y) is prepared. In step S52, c(x, y) is applied with Fourier transform to obtain C(u, v) (formula (2)). In step S53, a square root of C(u, v) is calculated to obtain the filter function F(u, v)(formula (3)). Steps S41, S51, S52, and S53 are processing similar to that of steps S11, S21, S22, and S23.

In step S54, F(u, v) is applied with inverse Fourier transform to obtain f(x, y)(formula (6)). In step S61, a(x, y) and f(x, y) are applied with convolution integration to obtain a pseudo speckle pattern b(x, y) (formula (7)).

$$f(x,y) = \text{IFFT}[F(u,v)] \quad (6)$$

$$b(x,y) = a(x,y) * f(x,y) \quad (7)$$

The pseudo speckle pattern b(x, y) generated in the above manner also has a light intensity statistical distribution in accordance with a statistical distribution of the two-dimensional pseudo random number pattern a(x, y) and a spatial structure (autocorrelation function) in accordance with the correlation function c(x, y).

In the present embodiment, the pseudo speckle pattern b(x, y) may be obtained by following any of the calculation procedures of FIG. 3 and FIG. 4.

That is, Fourier transform (A(u, v)) of the two-dimensional pseudo random number pattern a(x, y) having a statistical distribution in accordance with a light intensity statistical distribution of the pseudo speckle pattern b(x, y) to be generated is used as a first pattern, and a pattern of a square root (F(u, v)) of Fourier transform of the correlation function c(x, y) in accordance with an autocorrelation function of the pseudo speckle pattern b(x, y) to be generated is used as a second pattern, and a pattern of inverse Fourier transform of a product of the first pattern and the second pattern can be used as the pseudo speckle pattern b(x, y).

Alternatively, the two-dimensional pseudo random number pattern a(x, y) having a statistical distribution in accordance with a light intensity statistical distribution of the pseudo speckle pattern b(x, y) to be generated is used as a first pattern, and a pattern of inverse Fourier transform (f(x, y)) of a square root of Fourier transform of the correlation function c(x, y) in accordance with an autocorrelation function of the pseudo speckle pattern b(x, y) to be generated is used as a second pattern, and a pattern of convolution integral of the first pattern and the second pattern can be used as the pseudo speckle pattern b(x, y).

FIG. 5 is a table showing examples of the correlation function c and the filter function F. The correlation function c shown in the table is a function c(r) having only a distance r from the origin (0, 0) in real space as a variable. The corresponding filter function F is also a function F(k) having only a distance k from the origin (0, 0) in Fourier space as a variable. In each formula, r and k are non-negative real numbers, and η and ξ are positive real numbers.

As the correlation function c(x, y), a function with which C(u, v) of a result of Fourier transform becomes a function of a non-negative real number is selected, and a function with which a function value is gradually decreased as the distance r becomes larger is preferred. The correlation function c is preferably a function which has only the distance r as a variable. The correlation function c may be a function which has x and y as variables (for example, $\exp(-|x+y|/\xi)$). The correlation function c may have a function value of 1 at the origin (0, 0), and the function value may be an arbitrary value. The correlation function c may be one which cannot be expressed in a mathematical formula.

Figure 6A:
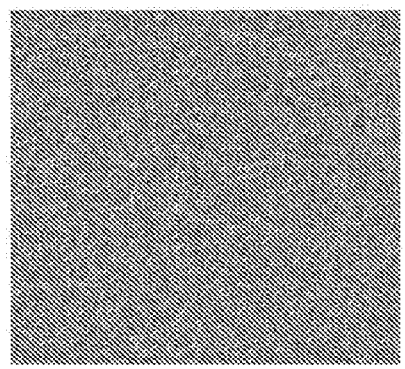
FIG. 6A and FIG. 6B are (A) a diagram illustrating an example of a two-dimensional pseudo random number pattern a(x, y) in which a statistical distribution follows a normal distribution, and (B) a diagram illustrating a pseudo speckle pattern b(x, y) obtained when the two-dimensional pseudo random number pattern a(x, y) of FIG. 6A and a correlation function $c(r)=\exp(-r)$ are used.
Figure 6B:
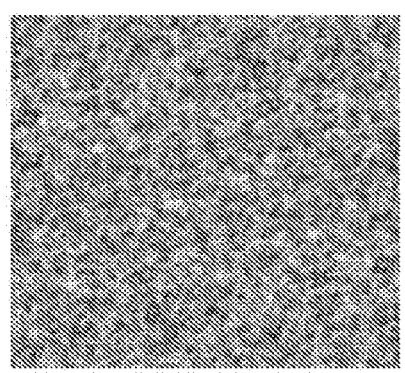
Figure 7A:
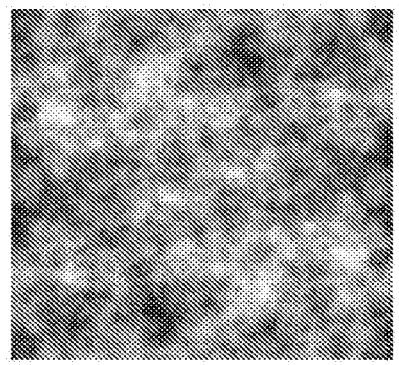
FIG. 7A and FIG. 7B are (A) a diagram illustrating a pseudo speckle pattern b(x, y) obtained when the two-dimensional pseudo random number pattern a(x, y) of FIG. 6A and a correlation function $c(r)=\exp(-r/9)$ are used, and (B) a diagram illustrating a light intensity statistical distribution (luminance histogram) of the pseudo speckle pattern b(x, y) of FIG. 7A.
Figure 7B:
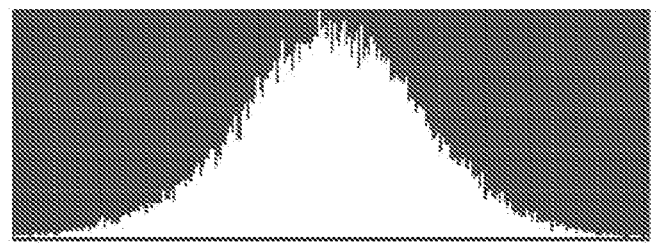

FIG. 6A is a diagram illustrating an example of the two-dimensional pseudo random number pattern a(x, y) in which a statistical distribution follows a normal distribution. FIG. 6B is a diagram illustrating the pseudo speckle pattern b(x, y) obtained when the two-dimensional pseudo random number pattern a(x, y) of FIG. 6A and the correlation function $c(r)=\exp(-r)$ are used. FIG. 7A is a diagram illustrating the pseudo speckle pattern b(x, y) obtained when the two-dimensional pseudo random number pattern a(x, y) of FIG. 6A and the correlation function $c(r)=\exp(-r/9)$ are used. FIG. 7B is a diagram illustrating a light intensity statistical distribution (luminance histogram) of the pseudo speckle pattern b(x, y) of FIG. 7A.

Figure 8A:
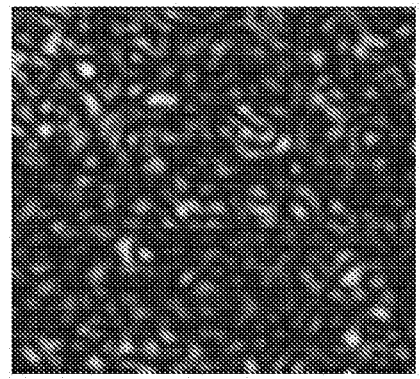
FIG. 8A and FIG. 8B are (A) a diagram illustrating an example of a speckle pattern generated by using a diffuser, and (B) a diagram illustrating a light intensity statistical distribution (luminance histogram) of the speckle pattern of FIG. 8A.
Figure 8B:
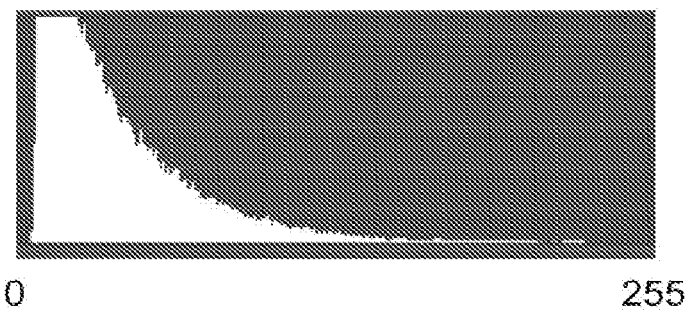

FIG. 8A is a diagram illustrating an example of a speckle pattern generated by using a diffuser. FIG. 8B is a diagram illustrating a light intensity statistical distribution (luminance histogram) of the speckle pattern of FIG. 8A. The light intensity statistical distribution (FIG. 8B) of the speckle pattern generated by using a diffuser can be approximated by an exponential function distribution, while the light intensity statistical distribution (FIG. 7B) of the pseudo speckle pattern b(x, y) can be approximated by a normal distribution, and substantially matches with a statistical distribution of the two-dimensional pseudo random number pattern a(x, y). Here, the horizontal axis of the light intensity statistical distribution (luminance histogram) of FIG. 7B and FIG. 8B shows a light intensity in 256 tones.

Figure 9A:
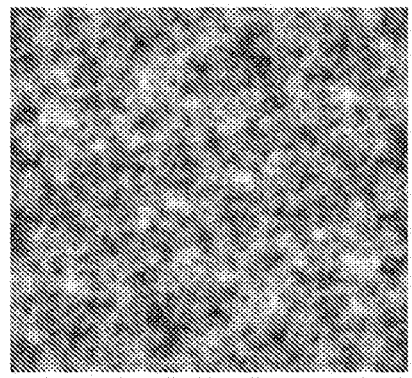
FIG. 9A and FIG. 9B are (A) a diagram illustrating a pseudo speckle pattern b(x, y) when the two-dimensional pseudo random number pattern a(x, y) of FIG. 6A and a correlation function $c(r)=\exp(-r/3)$ are used, and (B) a diagram illustrating an autocorrelation image of the pseudo speckle pattern b(x, y) of FIG. 9A.
Figure 9B:
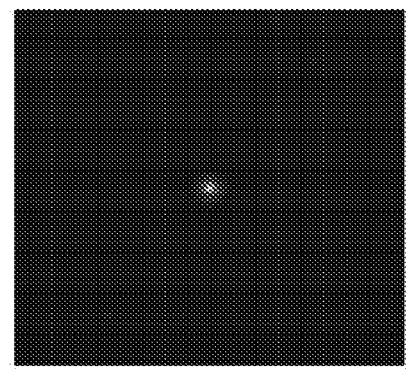
Figure 10:
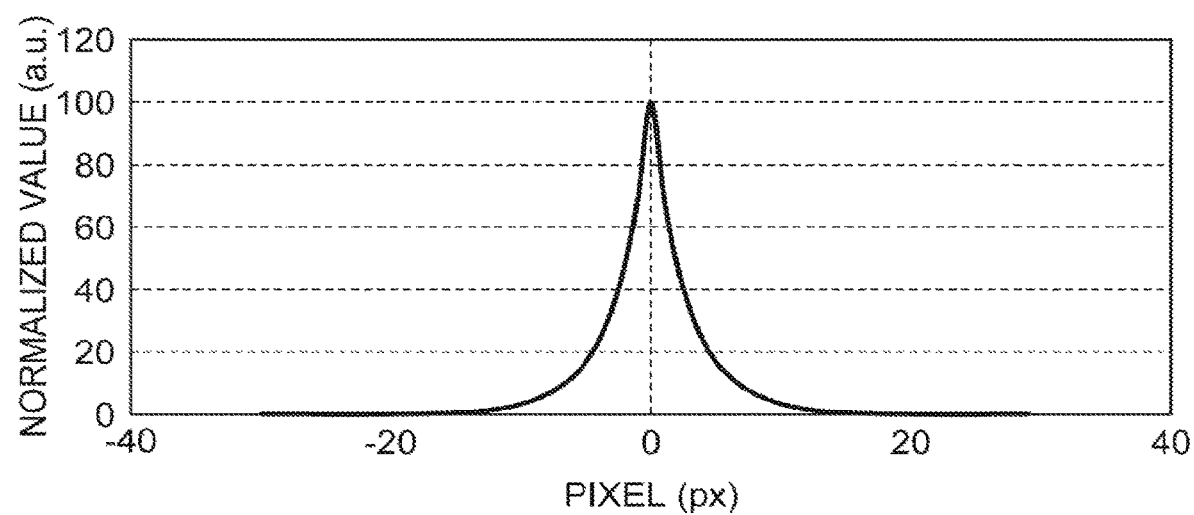
FIG. 10 is a diagram illustrating an intensity profile in the autocorrelation image of FIG. 9B.

FIG. 9A is a diagram illustrating the pseudo speckle pattern b(x, y) when the two-dimensional pseudo random number pattern a(x, y) of FIG. 6A and the correlation function $c(r)=\exp(-r/3)$ are used. FIG. 9B is a diagram illustrating an autocorrelation image of the pseudo speckle pattern b(x, y) of FIG. 9A. FIG. 10 is a diagram illustrating an intensity profile in the autocorrelation image of FIG. 9B. The intensity profiles in an x direction and a y direction substantially match with each other, and also substantially match with the correlation function $c(r)=\exp(-r/3)$. That is, the autocorrelation function of the pseudo speckle pattern b(x, y) substantially matches with the correlation function c.

In the pseudo speckle pattern generator and the pseudo speckle pattern generation method of the present embodiment, the pseudo speckle pattern b(x, y) is optically generated by using a spatial light modulator having a modulation distribution of intensities or phases based on the two-dimensional pseudo random number pattern a(x, y) and the filter function F(u, v). Hereinafter, description will be made on first to fourth embodiments of the pseudo speckle pattern generator 1 of the quantum simulator 100. Here, in FIG. 1, a pseudo speckle pattern generator 1D of the fourth embodiment is shown as the pseudo speckle pattern generator 1.

Figure 11:
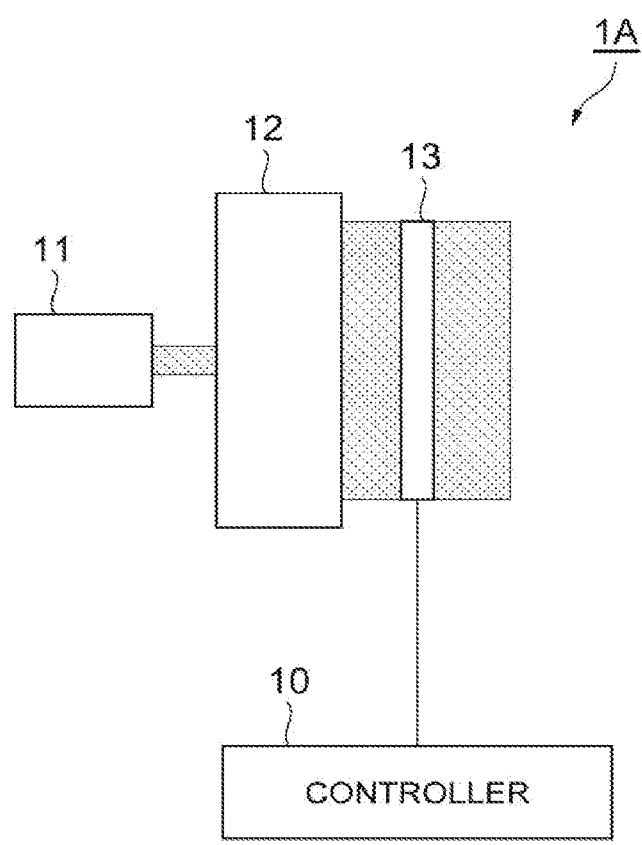
FIG. 11 is a diagram illustrating a configuration of a pseudo speckle pattern generator 1A of a first embodiment.

FIG. 11 is a diagram illustrating a configuration of a pseudo speckle pattern generator 1A of the first embodiment. The pseudo speckle pattern generator 1A includes the controller 10, the light source 11, the beam expander 12, and the spatial light modulator 13, and outputs the pseudo speckle pattern b(x, y) on an output plane of the spatial light modulator 13.

The light source 11 outputs light. For example, a laser light source, a lamp light source, an SLD (superluminescent diode) light source, or the like is used as the light source 11. The beam expander 12 is optically coupled to the light source 11, and outputs the light output from the light source 11 after enlarging a beam diameter. At this time, the light output from the beam expander 12 preferably has an intensity which is uniform in a beam cross section.

The spatial light modulator 13 is of an intensity modulation type, and has an intensity modulation distribution based on the pseudo speckle pattern b(x, y) generated in step S32 or S61. For example, a modulator in which a modulation medium is liquid crystal, a digital mirror device (DMD), or a deformable mirror (DM) is used as the spatial light modulator 13. The spatial light modulator 13 is optically coupled to the beam expander 12, inputs the light which is output from the light source 11 and has a beam diameter enlarged by the beam expander 12, spatially modulates the input light in accordance with the modulation distribution, and outputs the modulated light The pseudo speckle pattern b(x, y) generated on the output plane of the spatial light modulator 13 in the above manner has a light intensity statistical distribution in accordance with a statistical distribution of the two-dimensional pseudo random number pattern a(x, y) and a spatial structure in accordance with the correlation function c(x, y).

The controller 10 is electrically coupled to the spatial light modulator 13, and sets an intensity modulation distribution based on the pseudo speckle pattern b(x, y) calculated from the two-dimensional pseudo random number pattern a(x, y) and the correlation function c(x, y) to the spatial light modulator 13.

The controller 10 is configured, for example, with a computer, and includes a communication unit which is electrically coupled to the spatial light modulator 13 and performs communication, and further, an arithmetic unit, a storage unit, an input unit, and a display unit. The arithmetic unit includes a CPU, a DSP, or the like, and performs generation of the two-dimensional pseudo random number pattern a(x, y) and the correlation function c(x, y), Fourier transform, calculation of a square root, multiplication, convolution integration, calculation of an autocorrelation function, calculation of an intensity statistical distribution, and the like.

The storage unit includes, for example, a hard disk, a memory, or the like, and stores a generation condition of the two-dimensional pseudo random number pattern a(x, y) and the correlation function c(x, y), a calculation result of each pattern, and the like. The input unit includes, for example, a keyboard, a pointing device, or the like, and receives input of the above generation condition and the like. The display unit includes, for example, a liquid crystal display, and displays patterns of a(x, y), A(u, v), c(x, y), C(u, v), F(u, v), f(x, y), B(u, v), b(x, y), and the like.

In the present embodiment, an intensity modulation distribution of the spatial light modulator 13 is set based on the pseudo speckle pattern b(x, y) calculated from the two-dimensional pseudo random number pattern a(x, y) and the correlation function c(x, y), and accordingly, there is a high degree of freedom in setting a spatial structure or a light intensity statistical distribution of the generated pseudo speckle pattern b(x, y).

The two-dimensional pseudo random number pattern a(x, y) having a statistical distribution in accordance with a light intensity statistical distribution of the pseudo speckle pattern b(x, y) to be generated and the correlation function c(x, y) in accordance with an autocorrelation function of the pseudo speckle pattern b(x, y) to be generated are used, and an intensity modulation distribution of the spatial light modulator 13 is set based on the pseudo speckle pattern b(x, y) calculated from the above, and in this manner, the pseudo speckle pattern b(x, y) having a desired light intensity statistical distribution and a desired spatial structure can be generated.

In the pseudo speckle pattern generator or the pseudo speckle pattern generation method of the present embodiment, there is a high degree of freedom in setting a spatial structure or a light intensity statistical distribution of the generated pseudo speckle pattern b(x, y). In addition, the controller 10 can set a spatial structure or a light intensity statistical distribution of the pseudo speckle pattern b(x, y) with excellent reproducibility, and settings can be changed promptly.

The pseudo speckle pattern generator or the pseudo speckle pattern generation method of the present embodiment can generate the pseudo speckle pattern b(x, y) suitable for a measurement object and an optical operation object, and can be preferably used in a measurement technique and an optical operation technique effective for a variety of verification methods. Further, the pseudo speckle pattern generator or the pseudo speckle pattern generation method of the present embodiment can generate a bright pseudo speckle pattern having high luminance when the pseudo speckle pattern is used as a structured illumination, and accordingly, illumination can be performed with high sensitivity and within a short period of time, and the number of times of illumination can be reduced.

The fact that the pseudo speckle pattern b(x, y) having a desired spatial structure and a light intensity statistical distribution can be generated by the present embodiment can be confirmed in a manner described below. That is, the pseudo speckle pattern b(x, y) generated on an output plane of the spatial light modulator 13 is imaged by using a camera. Then, the controller 10 obtains an autocorrelation function of the pseudo speckle pattern b(x, y) obtained by imaging, and the function is compared with the correlation function c(x, y). Further, the controller 10 obtains a light intensity statistical distribution of the pseudo speckle pattern b(x, y) obtained by imaging, and the distribution is compared with a statistical distribution of the two-dimensional pseudo random number pattern a(x, y).

Figure 12:
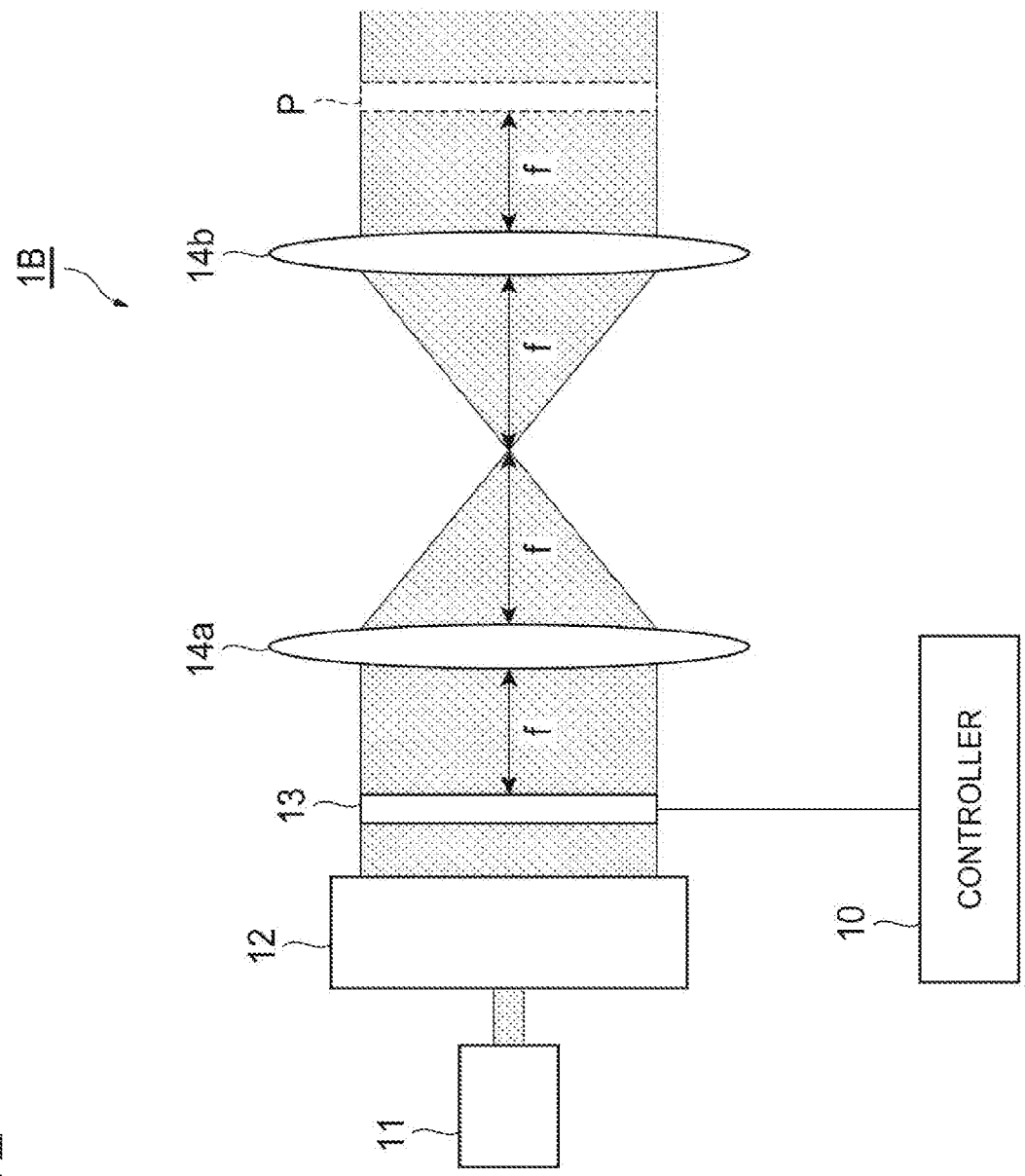
FIG. 12 is a diagram illustrating a configuration of a pseudo speckle pattern generator 1B of a second embodiment.

FIG. 12 is a diagram illustrating a configuration of a pseudo speckle pattern generator 1B of the second embodiment. The pseudo speckle pattern generator 1B includes the controller 10, the light source 11, the beam expander 12, the spatial light modulator 13, and lenses 14a and 14b, and generates the pseudo speckle pattern b(x, y) on a light pattern generating plane (image plane) P. When compared with the configuration of the pseudo speckle pattern generator A of the first embodiment shown in FIG. 11, the pseudo speckle pattern generator 1B of the second embodiment shown in FIG. 12 is different in that the lenses 14a and 14b are further included.

An optical system from the spatial light modulator 13 to the light pattern generating plane P constitutes a 4f imaging optical system. The lenses 14a and 14b input the light output from the spatial light modulator 13, and form an image of the pseudo speckle pattern b(x, y) on the light pattern generating plane P. By using the imaging optical system including the lenses 14a and 14b as described above, the pseudo speckle pattern b(x, y) can be generated on the light pattern generating plane P at a different position from an output plane of the spatial light modulator 13.

Figure 13:
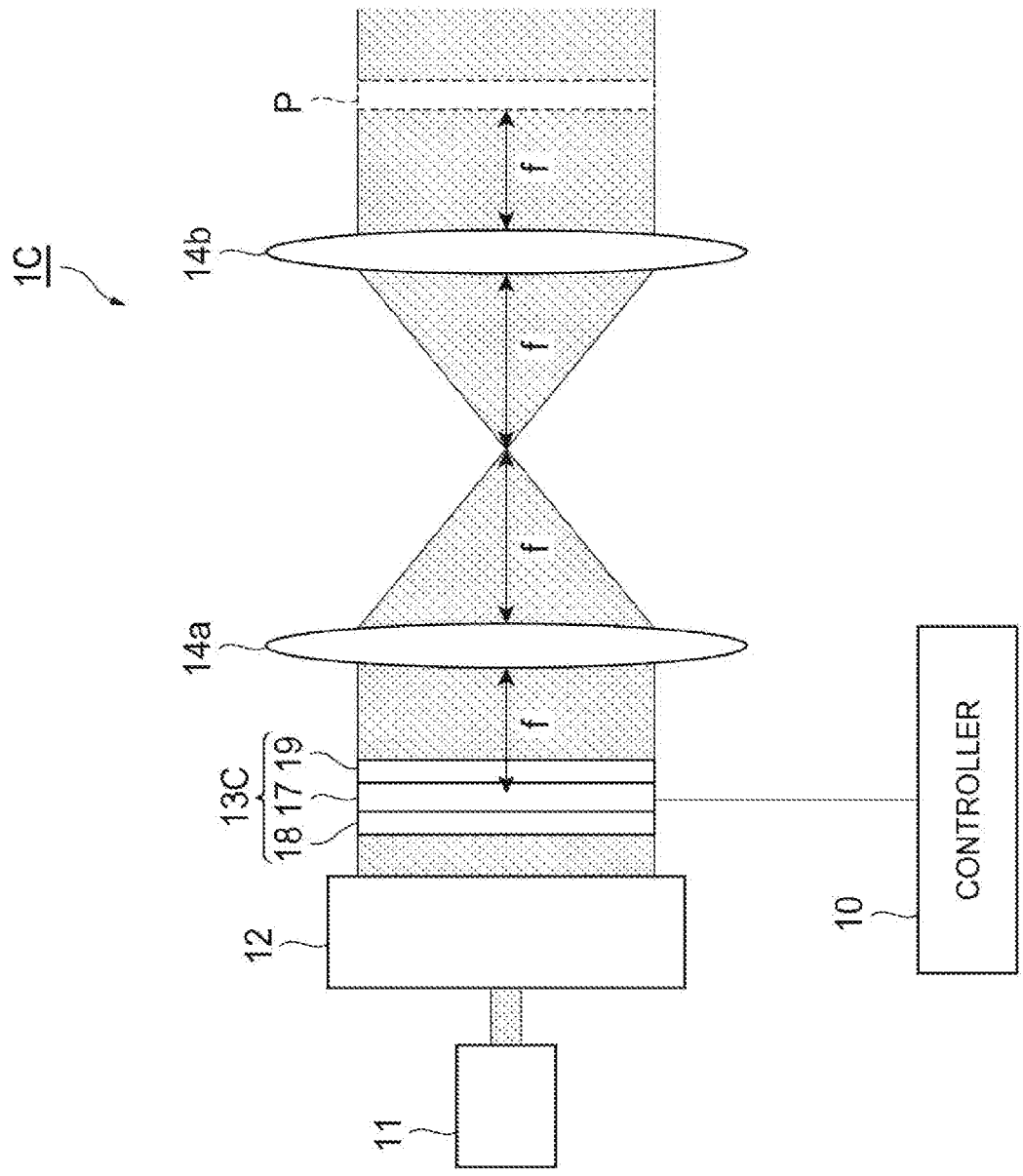
FIG. 13 is a diagram illustrating a configuration of a pseudo speckle pattern generator 1C of a third embodiment.

FIG. 13 is a diagram illustrating a configuration of a pseudo speckle pattern generator 1C of the third embodiment. The pseudo speckle pattern generator 1C includes the controller 10, the light source 11, the beam expander 12, a spatial light modulator 17 of a phase modulation type, polarizing plates 18 and 19, and the lenses 14a and 14b, and generates the pseudo speckle pattern b(x, y) on the light pattern generating plane P. When compared with the configuration of the pseudo speckle pattern generator 1B of the second embodiment shown in FIG. 12, the pseudo speckle pattern generator 1C of the third embodiment shown in FIG. 13 is different in that the spatial light modulator 17 of a phase modulation type and the polarizing plates 18 and 19 are included in place of the spatial light modulator 13 of an intensity modulation type. For the spatial light modulator 17 of a phase modulation type, for example, a modulator using liquid crystal as a modulation medium is used.

The polarizing plate 18 and the polarizing plate 19 are provided to sandwich the spatial light modulator 17 of a phase modulation type. In general, the spatial light modulator 17 using liquid crystal as a modulation medium has liquid crystal molecules oriented in a specific direction. The polarizing plates 18 and 19 are arranged with a polarization direction at an angle of 45 degrees relative to an orientation direction of the liquid crystal molecules. Polarization directions of the polarizing plates 18 and 19 may be parallel to each other or orthogonal to each other. The spatial light modulator 17 of a phase modulation type and the polarizing plates 18 and 19 are arranged in the above manner, so as to function substantially as the spatial light modulator 13C of an intensity modulation type. The controller 10 is electrically coupled to (the spatial light modulator 17 constituting) the spatial light modulator 13C, and sets an intensity modulation distribution of the spatial light modulator 13C (a phase modulation distribution of the spatial light modulator 17).

In the pseudo speckle pattern generators 1B and 1C, the light pattern generating plane P on which the pseudo speckle pattern b(x, y) is generated may be a back focal plane of the lens 14b, or a plane different from the back focal plane. For example, a pattern obtained by adding a Fresnel lens pattern to an intensity modulation distribution is set to the spatial light modulator 13, 13C, so that the pseudo speckle pattern b(x, y) can be generated on the light pattern generating plane P at a position different from that of the back focal plane of the lens 14b.

Figure 14:
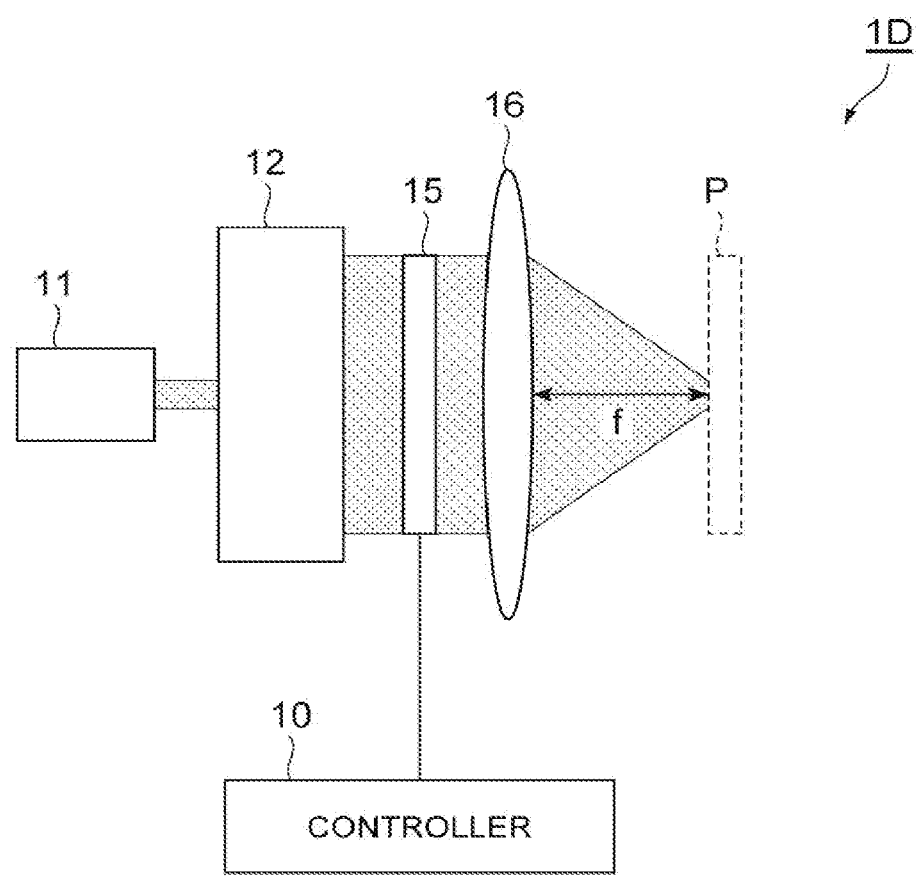
FIG. 14 is a diagram illustrating a configuration of a pseudo speckle pattern generator 1D of a fourth embodiment.

FIG. 14 is a diagram illustrating a configuration of a pseudo speckle pattern generator 1D of the fourth embodiment. The pseudo speckle pattern generator 1D includes the controller 10, the light source 11, the beam expander 12, the spatial light modulator 15, and the lens 16, and generates the pseudo speckle pattern b(x, y) on the light pattern generating plane P.

The spatial light modulator 15 is of a phase modulation type, and has a phase modulation distribution based on the pseudo speckle pattern b(x, y) generated in step S32 or S61. For the spatial light modulator 15 of a phase modulation type, for example, a modulator using liquid crystal as a modulation medium is used. The spatial light modulator 15 is optically coupled to the beam expander 12, inputs the light which is output from the light source 11 and has a beam diameter enlarged by the beam expander 12, spatially modulates the input light in accordance with the modulation distribution, and outputs the modulated light. The lens 16 is a reproducing optical system which inputs the light output from the spatial light modulator 15 and reproduces the pseudo speckle pattern b(x, y) on the light pattern generating plane P.

The controller 10 sets a computer generated hologram obtained based on the two-dimensional pseudo random number pattern a(x, y) and the correlation function c(x, y) as a modulation distribution of the spatial light modulator 15. The phase modulation distribution set in the spatial light modulator 15 is a computer generated hologram with which light output from the spatial light modulator 15 can be reproduced as the pseudo speckle pattern b(x, y) on the light pattern generating plane P by the lens 16 (reproducing optical system). The controller 10 uses an iterative Fourier transform method to generate a computer generated hologram whose reproduced image is the pseudo speckle pattern b(x, y), and sets the computer generated hologram to the spatial light modulator 15.

Here, FIG. 14 shows the spatial light modulator 15 of a transmission type, however, a spatial light modulator of a reflection type may be used as shown in FIG. 1.

Figure 15:
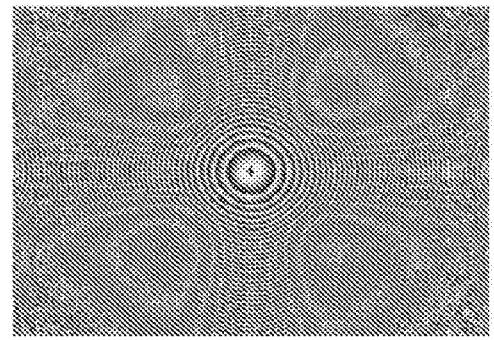
FIG. 15 is a diagram illustrating an example of a computer generated hologram set to a spatial light modulator 15 of the pseudo speckle pattern generator 1D of the fourth embodiment.

FIG. 15 is a diagram illustrating an example of the computer generated hologram set in the spatial light modulator 15 of the pseudo speckle pattern generator 1D of the fourth embodiment. In this diagram, degree of phase modulation is shown by a gray scale. In this case, the two-dimensional pseudo random number pattern a(x, y) whose statistical distribution follows a normal distribution and the correlation function $c(x, y)=\exp(-r/9)$ are used to calculate the pseudo speckle pattern b(x, y), and a computer generated hologram is obtained based on the pseudo speckle pattern b(x, y).

Figure 16A:
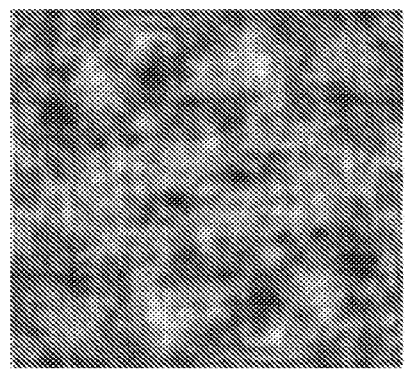
FIG. 16A and FIG. 16B are (A) a diagram illustrating a pseudo speckle pattern b(x, y) reproduced on a light pattern generating plane (image plane) P when the computer generated hologram of FIG. 15 is set to the spatial light modulator 15 of the pseudo speckle pattern generator 1D of the fourth embodiment as a phase modulation distribution, and (B) a diagram illustrating a light intensity statistical distribution (luminance histogram) of the pseudo speckle pattern b(x, y) of FIG. 16A.
Figure 16B:
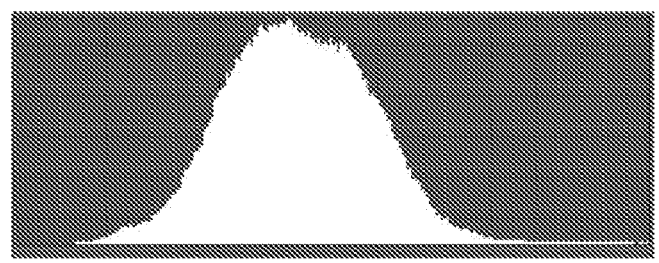

FIG. 16A is a diagram illustrating the pseudo speckle pattern b(x, y) reproduced on the light pattern generating plane (image plane) P when the computer generated hologram of FIG. 15 is set as a phase modulation distribution to the spatial light modulator 15 of the pseudo speckle pattern generator 1D of the fourth embodiment. FIG. 16B is a diagram illustrating a light intensity statistical distribution (luminance histogram) of the pseudo speckle pattern b(x, y) of FIG. 16A. The light intensity statistical distribution of the reproduced pseudo speckle pattern b(x, y) can be confirmed to be a normal distribution, similar to a statistical distribution of the two-dimensional pseudo random number pattern a(x, y).

The quantum simulator 100 and the quantum simulation method of the present embodiment use the pseudo speckle pattern generators 1 and 1A to 1D having the above configurations so as to be able to generate a pseudo speckle pattern having a desired spatial structure or a light intensity statistical distribution in the inside of the main vacuum chamber 2, and perform a variety of types of operation for atoms in the inside of the main vacuum chamber 2, and accordingly, a preferred model which properly shows a characteristic of an object can be constructed easily. In addition, since a pseudo speckle pattern can be generated with excellent reproducibility, accuracy of evaluation of an influence of disorder can be improved by experimentally repeating disorder constantly under the same condition and experimentally comparing a variety of types of disorder.

In the above embodiments, the pseudo random number pattern and the pseudo speckle pattern are two-dimensional, however, the pseudo random number pattern and the pseudo speckle pattern may be one-dimensional or three-dimensional.

The quantum simulator and the quantum simulation method are not limited to the embodiments and configuration examples described above, and a variety of modifications are possible.

A quantum simulator according to the above embodiments is configured to include (1) a chamber having a window, (2) a pseudo speckle pattern generator configured to generate a pseudo speckle pattern in the inside of the chamber from light allowed to enter the inside of the chamber through the window, and (3) a detector configured to detect an influence of generation of the pseudo speckle pattern on an atom in the inside of the chamber.

The pseudo speckle pattern generator of the quantum simulator may be configured to include, in one aspect, (a) a light source configured to output light, (b) a spatial light modulator configured to have a settable modulation distribution of an intensity, spatially modulate the light output from the light source in accordance with the modulation distribution, and output the modulated light as the pseudo speckle pattern, and (c) a controller configured to set the modulation distribution of the spatial light modulator based on a pseudo random number pattern.

Further, in this case, the pseudo speckle pattern generator may be configured to further include an imaging optical system configured to input the light output from the spatial light modulator to form an image of the pseudo speckle pattern in the inside of a chamber.

The pseudo speckle pattern generator of the quantum simulator may be configured to include, in another aspect, (a) a light source configured to output light, (b) a spatial light modulator configured to have a settable modulation distribution of a phase, spatially modulate the light output from the light source in accordance with the modulation distribution, and output the modulated light, (c) a reproducing optical system configured to input the light output from the spatial light modulator to reproduce the pseudo speckle pattern in the inside of the chamber, and (d) a controller configured to set a computer generated hologram obtained based on a pseudo random number pattern as the modulation distribution of the spatial light modulator.

In the pseudo speckle pattern generator of the quantum simulator, the controller may use, as a first pattern, Fourier transform of the pseudo random number pattern having a statistical distribution in accordance with a light intensity statistical distribution of the pseudo speckle pattern to be generated, may use, as a second pattern, a pattern of a square root of Fourier transform of a correlation function in accordance with an autocorrelation function of the pseudo speckle pattern to be generated, and may set the modulation distribution based on a pattern of inverse Fourier transform of a product of the first pattern and the second pattern to the spatial light modulator.

Further, in the pseudo speckle pattern generator of the quantum simulator, the controller may use, as a first pattern, the pseudo random number pattern having a statistical distribution in accordance with a light intensity statistical distribution of the pseudo speckle pattern to be generated, may use, as a second pattern, a pattern of inverse Fourier transform of a square root of Fourier transform of a correlation function in accordance with an autocorrelation function of the pseudo speckle pattern to be generated, and may set the modulation distribution based on a pattern of convolution integral of the first pattern and the second pattern to the spatial light modulator.

The quantum simulator may be configured to further include an atomic gas supply unit configured to supply an atomic gas to the inside of the chamber. Further, the quantum simulator may be configured to further include a light beam generator configured to generate a light beam emitted to the inside of the chamber through the window to trap the atom in the inside of the chamber.

A quantum simulation method according to the above embodiments is configured to include (1) a pseudo speckle pattern generation step of generating, by a pseudo speckle pattern generator, a pseudo speckle pattern in the inside of a chamber from light allowed to enter the inside of the chamber through a window of the chamber, and (2) a detection step of detecting, by a detector, an influence of generation of the pseudo speckle pattern on an atom in the inside of the chamber.

In the pseudo speckle pattern generation step in the quantum simulation method, in one aspect, a spatial light modulator configured to have a settable modulation distribution of an intensity may be used, the modulation distribution of the spatial light modulator may be set based on a pseudo random number pattern, and light output from a light source may be spatially modulated in accordance with the modulation distribution, and the modulated light may be output as the pseudo speckle pattern.

Further, in this case, in the pseudo speckle pattern generation step, an imaging optical system configured to input the light output from the spatial light modulator may be used to form an image of the pseudo speckle pattern in the inside of the chamber.

In the pseudo speckle pattern generation step in the quantum simulation method, in another aspect, a spatial light modulator configured to have a settable modulation distribution of a phase may be used, a computer generated hologram obtained based on a pseudo random number pattern may be set as the modulation distribution of the spatial light modulator, light output from a light source may be spatially modulated in accordance with the modulation distribution, and the modulated light may be output, and a reproducing optical system configured to input the light output from the spatial light modulator may be used to reproduce the pseudo speckle pattern in the inside of the chamber.

In the pseudo speckle pattern generation step in the quantum simulation method, Fourier transform of the pseudo random number pattern having a statistical distribution in accordance with a light intensity statistical distribution of the pseudo speckle pattern to be generated may be used as a first pattern, a pattern of a square root of Fourier transform of a correlation function in accordance with an autocorrelation function of the pseudo speckle pattern to be generated may be used as a second pattern, and the modulation distribution based on a pattern of inverse Fourier transform of a product of the first pattern and the second pattern may be set to the spatial light modulator.

Further, in the pseudo speckle pattern generation step in the quantum simulation method, the pseudo random number pattern having a statistical distribution in accordance with a light intensity statistical distribution of the pseudo speckle pattern to be generated may be used as a first pattern, a pattern of inverse Fourier transform of a square root of Fourier transform of a correlation function in accordance with an autocorrelation function of the pseudo speckle pattern to be generated may be used as a second pattern, and the modulation distribution based on a pattern of convolution integral of the first pattern and the second pattern may be set to the spatial light modulator.

The quantum simulation method may be configured to further include an atomic gas supply step of supplying, by an atomic gas supply unit, an atomic gas to the inside of the chamber. Further, the quantum simulation method may be configured to further include a light beam generation step of generating, by a light beam generator, a light beam emitted to the inside of the chamber through the window to trap the atom in the inside of the chamber.

The embodiments can be used as a quantum simulator and a quantum simulation method.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A quantum simulator, comprising:
   a chamber having a window;
   a pseudo speckle pattern generator configured to generate a pseudo speckle pattern in the inside of the chamber by light allowed to enter the inside of the chamber through the window; and
   a detector configured to detect an influence of generation of the pseudo speckle pattern on an atom in the inside of the chamber, wherein
   the pseudo speckle pattern generator includes:
   a light source configured to output light,
   a spatial light modulator configured to have a modulation distribution of a phase, spatially modulate the light output from the light source in accordance with the modulation distribution, and output the modulated light,
   a reproducing optical system configured to input the light output from the spatial light modulator to reproduce the pseudo speckle pattern in the inside of the chamber, and
   a controller configured to set a computer generated hologram obtained based on a two-dimensional pseudo random number pattern as the modulation distribution of the spatial light modulator, wherein
   to set the computer generated hologram as the modulation distribution of the spatial light modulator, the controller is configured to:
   generate, as a first pattern, the two-dimensional pseudo random number pattern expressing a light intensity statistical distribution for generating the pseudo speckle pattern,
   prepare a correlation function expressing a spatial structure for generating the pseudo speckle pattern,
   generate, as a second pattern, a pattern of inverse Fourier transform of a square root of Fourier transform of the correlation function,
   calculate the modulation distribution based on a pattern of convolution integral of the first pattern and the second pattern, and
   set the modulation distribution to the spatial light modulator.

2. The quantum simulator according to claim 1, further comprising an atomic gas supply unit configured to supply an atomic gas to the inside of the chamber.

3. The quantum simulator according to claim 1, further comprising a light beam generator configured to generate a light beam emitted to the inside of
   the chamber through the window to trap the atom in the inside of the chamber.

* * * * *